(12) United States Patent
Angel et al.

(10) Patent No.: US 9,454,621 B2
(45) Date of Patent: Sep. 27, 2016

(54) SURFACING NAVIGATIONAL SEARCH RESULTS

(71) Applicant: Google Inc., Mountain View, CA (US)

(72) Inventors: Alvertos Dayid Angel, Zürich (CH); Péter Szabó, Zürich (CH); Mate Szalay, Zürich (CH); Stanislav Belogolov, Zürich (CH); Abraham Moolenaar, Zürich (CH); Balazs Racz, Zürich (CH); David Nachum, San Francisco, CA (US)

(73) Assignee: Google Inc., Mountain View, CA (US)

( * ) Notice: Subject to any disclaimer, the term of this patent is extended or adjusted under 35 U.S.C. 154(b) by 335 days.

(21) Appl. No.: 14/144,933

(22) Filed: Dec. 31, 2013

(65) Prior Publication Data

US 2015/0186474 A1    Jul. 2, 2015

(51) Int. Cl.
  *G06F 17/30*    (2006.01)
(52) U.S. Cl.
  CPC ..... *G06F 17/30979* (2013.01); *G06F 17/3097* (2013.01); *G06F 17/30991* (2013.01)
(58) Field of Classification Search
  CPC ............ G06F 17/3097; G06F 17/30979; G06F 17/30991
  USPC ........................................ 707/722
  See application file for complete search history.

(56) References Cited

U.S. PATENT DOCUMENTS

| | | | |
|---|---|---|---|
| 7,912,852 B1* | 3/2011 | McElroy | G06F 17/30864 705/80 |
| 8,204,897 B1* | 6/2012 | Djabarov | G06F 17/30705 707/767 |
| 8,290,976 B2 | 10/2012 | Klein et al. | |
| 8,326,826 B1 | 12/2012 | Upstill et al. | |
| 8,359,300 B1* | 1/2013 | Shin | G06F 17/3087 707/640 |
| 8,412,699 B1 | 4/2013 | Mukherjee et al. | |
| 8,412,728 B1 | 4/2013 | Roskind | |
| 8,504,437 B1 | 8/2013 | Agarwal et al. | |
| 8,930,350 B1* | 1/2015 | Herscovici | G06F 17/3064 707/723 |
| 2007/0061317 A1 | 3/2007 | Ramer et al. | |
| 2008/0045190 A1 | 2/2008 | Ballou | |
| 2008/0059508 A1* | 3/2008 | Lu | G06F 17/30707 |
| 2008/0072180 A1* | 3/2008 | Chevalier | G06F 17/3089 715/861 |
| 2008/0147653 A1* | 6/2008 | Collier | G06F 17/30864 |

(Continued)

OTHER PUBLICATIONS

Article entitled "How Google May Identify Navigational Queries and Resources", by Slawski, dated Dec. 9, 2012.*

(Continued)

*Primary Examiner* — Mahesh Dwivedi
(74) *Attorney, Agent, or Firm* — Middleton Reutlinger (57) ABSTRACT

Methods and apparatus for determining navigational search results based on one or more signals are presented. A partial search query of a user may be received. A superset of candidate navigational search results may be determined based on the partial query. A subset of navigational search results may be selected from the superset based at least in part on one or more signals. The subset of navigational search results may then be provided for presentation to the user independently from presentation to the user of other search results that are responsive to the partial query.

17 Claims, 5 Drawing Sheets

(56) References Cited

U.S. PATENT DOCUMENTS

| | | | | |
|---|---|---|---|---|
| 2008/0172374 | A1* | 7/2008 | Wolosin | G06F 17/3087 |
| 2008/0177714 | A1* | 7/2008 | Garbow | G06F 17/30398 |
| 2008/0250012 | A1* | 10/2008 | Hinckley | G06F 17/30864 |
| 2009/0083232 | A1 | 3/2009 | Ives et al. | |
| 2009/0299964 | A1* | 12/2009 | Cameron | G06F 17/30864 |
| 2010/0131902 | A1* | 5/2010 | Teran | G06F 17/30973 715/843 |
| 2011/0055189 | A1* | 3/2011 | Effrat | G06F 17/3064 707/706 |
| 2011/0093488 | A1 | 4/2011 | Amacker et al. | |
| 2011/0191364 | A1* | 8/2011 | LeBeau | G06F 17/30672 707/767 |
| 2012/0117049 | A1* | 5/2012 | Zhou | G06F 17/30864 707/706 |
| 2012/0143839 | A1* | 6/2012 | Zhou | G06F 17/30864 707/706 |
| 2012/0209698 | A1* | 8/2012 | Venkatakrishnan | G06Q 30/0277 705/14.49 |
| 2012/0246165 | A1* | 9/2012 | Batraski | G06F 17/30867 707/740 |
| 2013/0110825 | A1* | 5/2013 | Henry | G06F 17/30864 707/723 |
| 2013/0238587 | A1* | 9/2013 | Annau | G06F 17/30666 707/708 |
| 2013/0282702 | A1* | 10/2013 | Zhu | G06F 17/3064 707/723 |
| 2013/0282749 | A1* | 10/2013 | Batraski | G06F 17/30864 707/767 |
| 2014/0040224 | A1* | 2/2014 | Grant | G06F 17/3087 707/706 |
| 2014/0136536 | A1* | 5/2014 | Ramsey | G06F 17/30867 707/733 |
| 2014/0188927 | A1* | 7/2014 | Moxley | G06F 17/30867 707/769 |
| 2014/0244634 | A1* | 8/2014 | Duleba | G06F 17/3087 707/724 |
| 2014/0280039 | A1* | 9/2014 | Bach | G01C 21/3611 707/722 |
| 2014/0280289 | A1* | 9/2014 | Marantz | G06F 17/30392 707/767 |
| 2015/0169750 | A1* | 6/2015 | Cohen | G06F 17/30864 707/711 |

OTHER PUBLICATIONS

Article entitled "Microsoft on Navigational Queries and Best Match", by Slawski, dated Dec. 19, 2009.*
Article entitled "Redefining Navigational Queries to Find Perfect Sites", by Slawski, dated Mar. 13, 2008.*
Article entitled "Yahoo Search Direct", by Google Operating System, dated Mar. 24, 2011.*
Article entitled "Yahoo!s New Search Box of Awesome: Search Direct", by Yahoo, dated Mar. 23, 2011.*
Article entitled "Google flight search bias? What about Bing?", by Schaal, dated Jan. 3, 2012.*
Kashyap, Abhijith et al, "BioNav: Effective Navigation on Query Results of Biomedical Databases," Data Engineering 2009. ICDE '09 IEEE 25th International Conference, Shanghai, China, 12 pages. Mar. 29, 2009.
Chakrabarti, Deepayan et al, "Quicklink Selecton for Navigational Query Results," International World Wide Web Conference Committee (IW3C2); WWW 2009, Apr. 20-24, 2009, Madrid, Spain, pp. 391-400. Apr. 20, 2009.
Kim, Larry, "Google SERP Dumps 5.5% of Organic First Page Listings," Blog Published on WordStream (http://www.wordstream.com/print/2382; 9 pages. Oct. 22, 2013.
International Search Report and Written Opinion of PCT Ser. No. PCT/US14/72662 Apr. 23, 2015.

* cited by examiner

| Valenti| | 450 | Search |

- Valentia Oranges — 456a
- Valentia Island — 456b
- Valentine's Day gift ideas — 456c
- Valentine's Day getaways — 456d
- Valentino's Italian Food Market — 456e

— 452

| ✉ | still interested in table?"<br>*Stacy Valentine, me* | 12/1/2010 1:49pm | — 454a |
| ✉ | Be prepared this Valentine's Day<br>*Flower Shop* | 2/12/2012 2:30pm | — 454b |
| ✉ | Your upcoming Valentine's itinerary<br>*Travel Agent* | 2/8/2013 2:30pm | — 454c |
| PDF | Your Valentine's gift invoice — 454d<br>*Chocolate Store* | | |

Fig. 4A

| Valenti| | 450 | Search |

- Valentine's Day gift ideas — 456c
- Valentine's Day getaways — 456d

— 452

| ✉ | Your upcoming Valentine's itinerary<br>*Travel Agent* | 2/8/2013 2:30pm | — 454c |
| PDF | Your Valentine's gift invoice — 454d<br>*Chocolate Store* | | |

Fig. 4B

Fig. 5

SURFACING NAVIGATIONAL SEARCH RESULTS

BACKGROUND

Search engines provide information about documents such as web pages, images, text documents, emails, and/or multimedia content. A search engine may identify the documents in response to a user's search query that includes one or more search terms. The search engine may rank the documents based on the relevance of the documents to the query and the importance of the documents, and may provide search results that include aspects of and/or links to the identified documents. In some cases, search engines may additionally or alternatively provide information that is responsive to the search query yet unrelated to any particular document (e.g., "local time in Tokyo").

A user may use a search engine to locate a particular document, rather than a plurality of documents that satisfy the user's search query. Such search queries may be referred to as "navigational search queries." "Navigational search results" include the most relevant search results returned from navigational queries. For instance, a user wishing to visit a particular company's website may input the company's name into a search engine field, rather than typing a hard-to-remember URL of the company's website into the user's web browser. The top returned search result may be the company's main website, which may be what the user seeks.

SUMMARY

This specification is directed generally to surfacing navigational search results based on one or more signals to enhance a user's experience when performing a navigational search query. In particular, navigational search results that are highly likely to be pertinent and/or useful to the user are "surfaced," or brought to the user's attention, e.g., by being rendered to the exclusion of or more prominently than other less pertinent navigational search results. In some implementations, upon receiving at least a partial search query of a user, a superset of candidate navigational search results may be identified based on the partial search query. For instance, assume a user has typed part of a search query— e.g., "Ronald Reagan b"—into a search/URL input field of a mobile web browser. One or more candidate navigational search results deemed likely to satisfy the partially-formed query (also referred to herein as "partial query")—e.g., information about Ronald Reagan's birthday, a website describing Ronald Reagan's Burma policy, information about Ronald Reagan's birthplace, a website selling Ronald Reagan bobbleheads, a website advertising a Ronald Reagan benefit—may be identified and presented in a drop down menu below the input field. A subset of navigational results may then be identified from within the superset based at least in part on one or more signals. These signals may include but are not limited to characteristics of alternative query suggestions provided to the user, characteristics of the partial query, and/or characteristics of the candidate navigational search results. For instance, the superset of five candidate navigational search results described above may be narrowed in the drop down menu to a subset of two navigational search results—e.g., information about Ronald Reagan's birthday, information about Ronald Reagan's birthplace— based on, for instance, signals reflecting a user's interest in factual history, rather than politics, novelty items or events.

In some implementations, a computer implemented method may be provided that includes the steps of: receiving a partial search query of a user; identifying a superset of candidate navigational search results based on the partial query; selecting a subset of navigational search results from the superset based at least in part on one or more signals; and providing the subset of navigational search results for presentation to the user independently from presentation to the user of other search results that are responsive to the partial query.

This method and other implementations of technology disclosed herein may each optionally include one or more of the following features.

The method may further include identifying one or more alternate query suggestions based on the partial query, wherein the one or more signals includes one or more characteristics of the one or more alternate query suggestions. In some implementations, the one or more characteristics of the alternate query suggestions may include one or more scores associated with one or more alternate query suggestions and/or one or more identifiers contained in one or more alternate query suggestions.

In some implementations, the method may further include selecting, from the identified one or more alternate query suggestions, a subset of alternate query suggestions based at least in part on one or more signals; and providing the subset of selected alternate query suggestions.

In some implementations, the one or more signals may include one or more characteristics of the partial query. In some implementations, the one or more characteristics of the partial query may include an identifier contained in the partial query, a length of the partial query, and/or an indication that the partial query has been received from the user previously.

In some implementations, the one or more signals may include one or more characteristics of the candidate navigational search results. In some implementations, the one or more characteristics of the candidate navigational search results may include scores associated with the candidate navigational search results, a ranking of the candidate navigational search results, and/or document types of the candidate navigational search results.

In some implementations, selecting the subset of navigational search results may include selecting a predetermined number of the candidate navigational search results that best satisfy a criterion.

In some implementations, the method may further include generating a search result presentation interface that includes both the candidate navigational search results and the subset of navigational search results. In some implementations, the search result presentation interface may be configured so that the subset of navigational search results is presented to the user more prominently than or before the candidate navigational search results. In some implementations, the method may further include generating a search result presentation interface configured so that the set of navigational search results is presented to the user more prominently than or before the search results that are responsive to the partial query.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
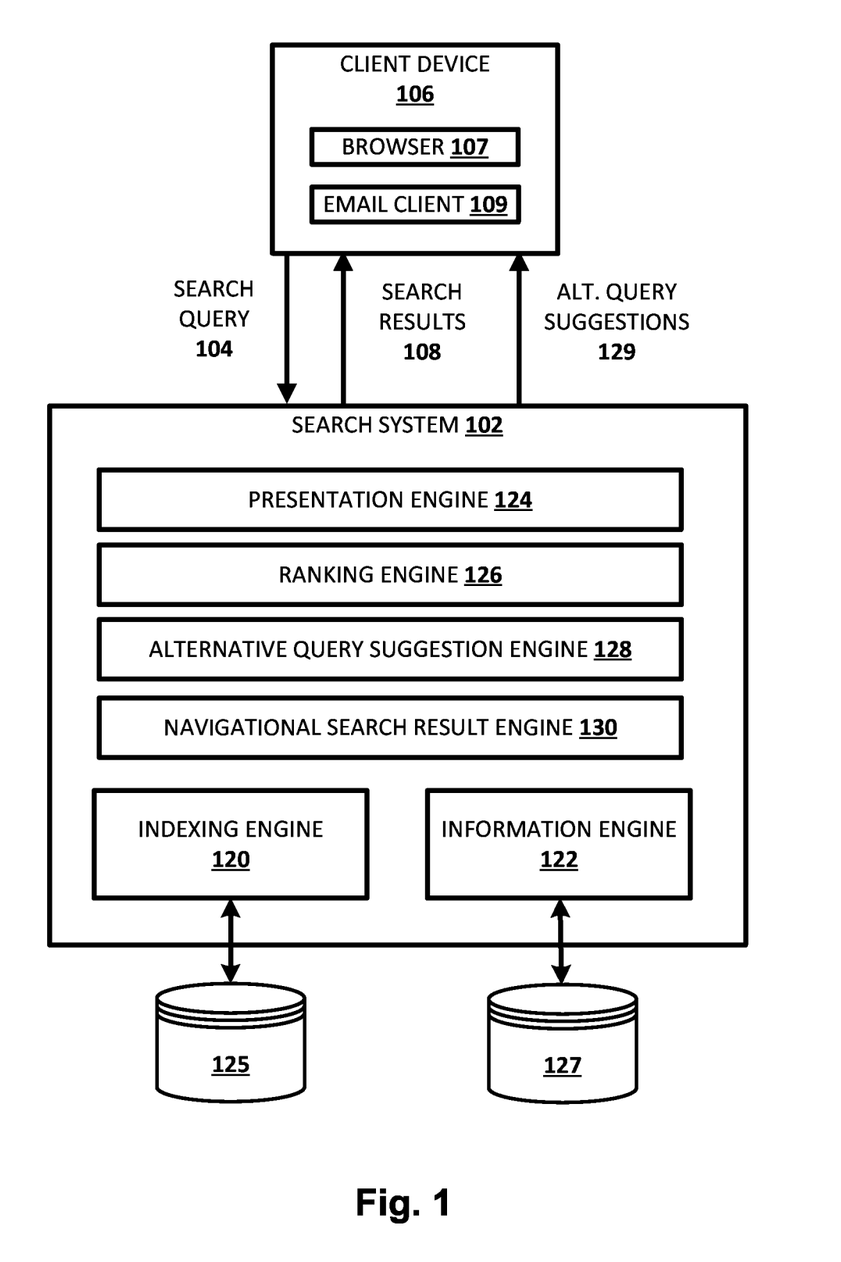
FIG. 1 illustrates an example environment in which supersets and subsets of navigational search results may be identified based on one or more signals.

FIG. 1 illustrates an example environment in which supersets and subsets of navigational search results may be identified based on one or more signals. The example environment includes a client device 106 and a search system 102. Search system 102 may be implemented in one or more computers that communicate, for example, through a network (not depicted). Search system 102 is an example of an information retrieval system in which the systems, components, and techniques described herein may be implemented and/or with which systems, components, and techniques described herein may interface.

A user may interact with search system 102 via client device 106. Search system 102 receives search queries 104 from the client device 106 and returns search results 108 in response to the search queries 104. Each search query 104 is a request for information. Search query 104 can be, for example, in a text form and/or in other forms such as, for example, audio form and/or image form. Other computer devices may submit search queries to the search system 102 such as additional client devices and/or one or more servers implementing a service for a website that has partnered with the provider of the search system 102. For brevity, however, the examples are described in the context of client device 106.

Client device 106 may be a computer coupled to the search system 102 through a network such as a local area network (LAN) or wide area network (WAN) such as the Internet. The client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. The client device 106 typically includes one or more applications to facilitate submission of search queries and the sending and receiving of data over a network. For example, the client device 106 may execute one or more applications, such as a browser 107 and/or email client 109, that allow users to formulate queries and submit the queries to the search system 102.

In some implementations, client device 106 may execute one or more applications, such as the browser 107 or email client 109, that execute instructions provided by the search system 102 to modify search results based on one or more signals. The client device 106 and the search system 102 each include memory for storage of data and software applications, a processor for accessing data and executing applications, and components that facilitate communication over a network. The operations performed by the client device 106 and/or the search system 102 may be distributed across multiple computer systems. The search system 102 may be implemented as, for example, computer programs running on one or more computers in one or more locations that are coupled to each other through a network.

Search system 102 may include an indexing engine 120, an information engine 122, a presentation engine 124, a ranking engine 126, an alternative query suggestion engine 128, and a navigational search result engine 130. In some implementations one or more of engines 120, 124, 126, 128 and/or 130 may be omitted. In some implementations all or aspects of one or more of engines 120, 124, 126, 128 and/or 130 may be combined. In some implementations, one or more of engines 120, 124, 126, 128 and/or 130 may be implemented in a component that is separate from the search system 102. In some implementations, one or more of engines 124, 126, 128 and/or 130, or any operative portion thereof, may be implemented in a component that is executed by client device 106.

Indexing engine 120 maintains an index 125 for use by search system 102. The indexing engine 120 processes documents and updates index entries in the index 125, for example, using conventional and/or other indexing techniques. For example, the indexing engine 120 may crawl one or more resources such as the World Wide Web and index documents accessed via such crawling. As another example, the indexing engine 120 may receive information related to one or documents from one or more resources such as web masters controlling such documents and index the documents based on such information. A document is any data that is associated with a document address. Documents include web pages, word processing documents, portable document format (PDF) documents, images, emails, calendar entries, videos, and web feeds, to name just a few. Each document may include content such as, for example: text, images, videos, sounds, embedded information (e.g., meta information and/or hyperlinks); and/or embedded instructions (e.g., ECMAScript implementations such as JavaScript).

Information engine 122 may optionally maintain another index 127 that includes or facilitates access to non-document-specific information for use by the search system 102. For example, search system 102 may be configured to return information in response to search queries that appear to seek specific information. If a user searches for "Ronald Reagan's birthday," search system 102 may receive, e.g., from information engine 122, the date, "Feb. 6, 1911." This information may be returned to the user as a part of search results 108 that is separate from documents received from indexing engine 120. In some implementations, index 127 itself may contain information, or it may link to one or more other sources of information, such as online encyclopedias, almanacs, and so forth. In various implementations, index 25 or index 27 may include mappings between queries (or query terms) and documents and/or information.

In this specification, the term "database" and "index" will be used broadly to refer to any collection of data. The data of the database and/or the index does not need to be structured in any particular way and it can be stored on storage devices in one or more geographic locations. Thus, for example, the indices 125 and 127 may include multiple collections of data, each of which may be organized and accessed differently.

Presentation engine 124 may provide search results 108 for presentation to the user of client device 106. For instance, presentation engine 124 may provide, to client device 106, the subset of navigational search results selected from the superset of candidate navigational search results based on one or more signals, e.g., as a list, as a search results presentation interface, etc. In some implementations, presentation engine 124 may provide to the user both the subset and candidates of the superset that were not selected for the subset. In some such cases, presentation engine 124 may cause the subset to be visually emphasized over or presented before the unselected candidates. For instance, the subset of navigational results may be visually emphasized over unselected candidate navigational search results using fonts, font sizes, colors, animation, borders, margins, or other visual indicia. In other cases, the subset of navigational search results may be presented first, followed by non-selected candidate search results. In other implementations, presentation engine 124 may provide only the subset of navigational search result to the user, e.g., to be displayed as items of a drop down menu underneath a search input field.

Ranking engine 126 may use the indices 125 and/or 127 to identify documents and other information responsive to the search query 104, for example, using conventional and/or other information retrieval techniques. The ranking engine 126 may calculate scores for the documents and other information identified as responsive to the search query 104, for example, using one or more ranking signals. Each ranking signal may provide information about the document or information itself, the relationship between the document or information and the search query 104, and/or the relationship between the document or information and the user performing the search.

Alternative query suggestion engine 128 may use one or more signals and/or other information, such as a database of alternative query suggestions (not depicted) and/or information about a user of client device 106 (e.g., search history, GPS location, user attributes), to generate alternative query suggestions 129 to provide to client device 106 along with the search results 108. As a user types consecutive characters of the search query, alternative query suggestion engine 128 may identify alternative queries that may be likely to yield results that are useful to the user. For instance, assume the client device 106 is located in Chicago, and has typed the characters, "restaur." Alternative query suggestion engine 128 may, based on a location signal indicating that the client device 106 is in Chicago and a search history signal indicating a user's preference for restaurants with live music, suggest a query, "restaurants in Chicago with live music." As another example, for a user who has typed "Ronald Reagan's birt," alternative query suggestion engine 128 may, e.g., using techniques such as prefix matching, determine and suggest alternative queries such as "Ronald Reagan's birthday," "Ronald Reagan's birthplace," "Ronald Reagan's birth control position," and so forth. Alternative query suggestion engine 128 may provide other suggestions as well, such as spelling-corrected versions of a partially-formed search query.

Navigational search result engine 130 uses indices 125 and 127 to select a superset of candidate navigational search results, which may include documents (from index 125) or information (from index 127) deemed likely to be pertinent to the user. Navigational search result engine 130 may then select a subset of the superset deemed even more likely to be pertinent to the user based on one or more signals, which are described below with reference to FIG. 2.

Figure 2:
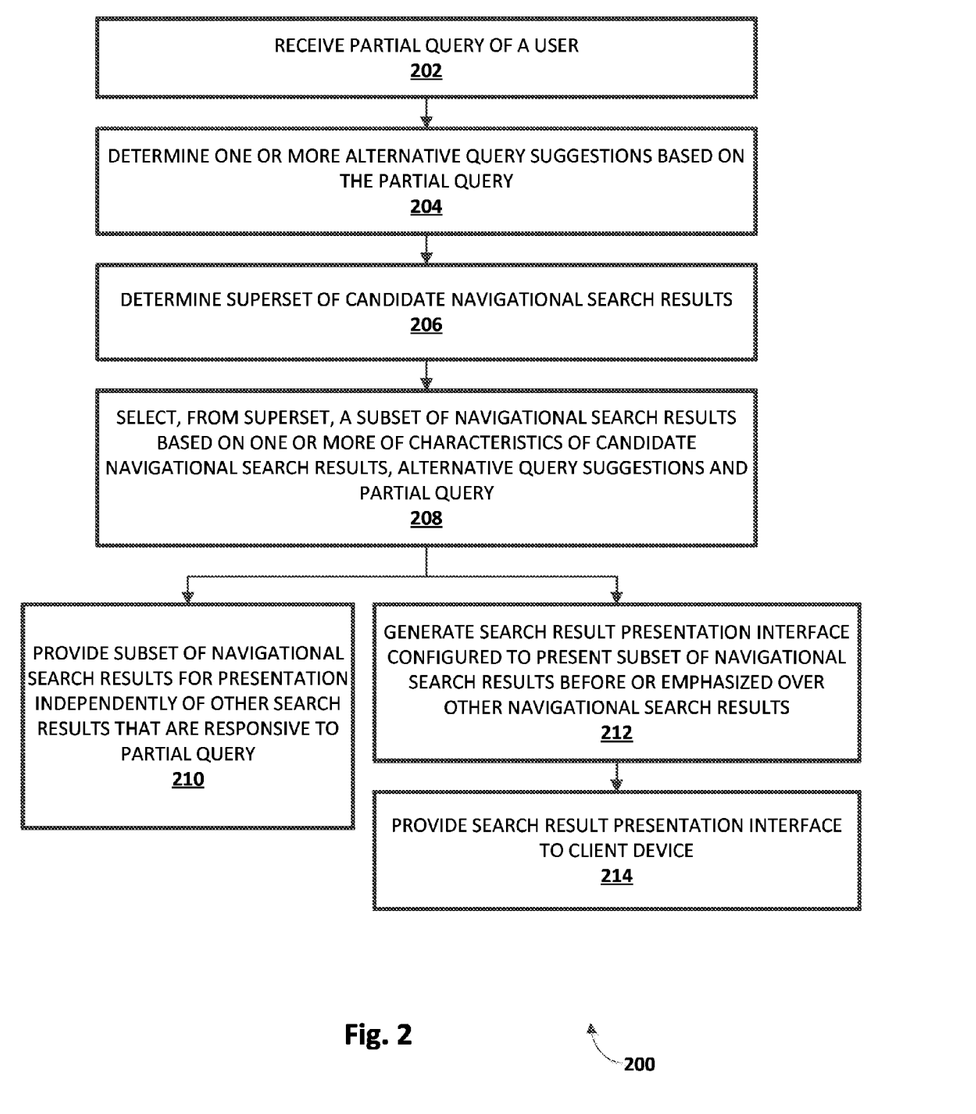
FIG. 2 is a flow chart illustrating an example method of surfacing navigational search results based on one or more signals.

Referring now to FIG. 2, an example method 200 of surfacing navigational search results based on one or more signals is described. For convenience, the operations of the flow chart are described with reference to a system that performs the operations. This system may include various components of various computer systems. For instance, some operations may be performed at the client device 106, while other operations may be performed by one or more components of the search system 102, such as the navigational search result engine 130, alternative query suggestion engine 128, the presentation engine 124, and so forth. Moreover, while operations of method 200 are shown in a particular order, this is not meant to be limiting. One or more operations may be reordered, omitted or added.

At block 202, a partial query of a user is received by the system. For instance, the user may begin typing a search query in a search input field rendered by the browser 107 executing on the client device 106. In some implementations, each time the user types an additional character, an updated partial search query may be provided to the system, and method 200 may be repeated with the updated search query.

At block 204, the system may determine one or more alternative query suggestions. In some implementations, alternative query suggestions may be determined based wholly or partially on the partial search query and/or signals from ranking engine 126, using conventional or other techniques. At block 206, the system may identify a superset of candidate navigational search results. In some implementations, the superset of candidate navigational search results may be determined using various techniques, including but not limited to conventional techniques based on the partial query itself (e.g., its click rate), signals from ranking engine 126, and/or signals associated with alternative query suggestions determined at block 204, such as popularity of and/or search results returned by alternative query suggestions.

At block 208, the system may select a subset of navigational search results from the superset. While the system may select any number of candidate navigational search results for inclusion in the subset, some implementations may limit the subset to a relatively small number of navigational results, such as less than three, e.g., to avoid inundating a user with too many choices. In instances where one candidate navigational result stands out far above the rest (e.g., a website often visited by a user), that may be the only candidate navigational search result selected for the subset. It is even contemplated that in some implementations, zero candidate navigational search results may be selected for the subset, e.g., if signals indicate that none of the candidate navigational search results satisfies a particular criterion or threshold.

In some implementations, the system may select the subset of navigational search results based on one or more signals, including but not limited to one or more characteristics of the partially-formed query, one or more characteristics of candidate navigational search results of the superset determined at block 206, and/or one or more characteristics of alternative query suggestions determined at block 204.

One or more characteristics of the partial search query itself may serve as signals used to select a subset of navigational search results from the superset. In some implementations, the system may consider "identifiers" (described below) contained in the partial query in selecting the subset of navigational search results. In some implementations, the system may consider a length of the partial query (e.g., in words and/or characters). For example, before a user has typed a predetermined number of characters, the system may select a relatively large number of navigational search results for the subset. This may be on the basis that there may not yet be enough information in the partially-formed search query to make a decision with any confidence as to which navigational search results are likely to be useful to the user, and which are not. However, after the user has typed at least the predetermined number of characters, the system may select fewer navigational search results for the subset, on the basis that the partially-formed search query now has enough information to make a decision with more confidence.

In some implementations, the system may consider a history of the partial query. For example, assume the partially-formed search query is part of another query that the user has searched previously. Any candidate navigational results selected by the user after such a previous search may be highly likely to be selected by the system for the subset of navigational search results. This may be especially true where the user has searched the search query numerous times and selected the same navigational result each time. This may indicate that the user prefers to navigate to the navigational search result (e.g., a particular webpage, a particular email) indirectly, using a search engine interface, rather than directly to the result (e.g., by typing a URL or navigating a graphical file management system). In some such cases, the system may select only that candidate navigational search result for the subset of navigational search results. As another related example, the system may also consider how recently a partially-formed query (or a full query that the partially-formed query appears to be approaching) was submitted by the user. The system may be less likely to include a navigational search result selected after submission of one query two years ago in the subset than another navigational search result selected after submission of a different query two days ago.

Additional signals that may be based on the search query 104 itself include but are not limited to the terms of the query, an identification of the user who submitted the query, and/or a characteristic of the user who submitted the query (e.g., the geographic location from where the query was submitted, the language of the user who submitted the query, interests of the user who submitted the query, and/or a type of the client device 106 used to submit the query (e.g., mobile device, laptop, desktop)). The identification of the user can be, for example, a user name or the IP address of the client device 106. The geographic location from where the search query 104 was submitted can be, for example, a continent, a country, a state, a city, or geographic coordinates, such as latitude and longitude. Additional examples include locations where a query term appears in the title, body, and text of anchors in a document, where a query term appears in anchors pointing to the search result, how a term is used in the document (e.g., in the title of the document, in the body of the document, or in a link in the document), the term frequency (i.e., the number of times the term appears in a corpus of documents in the same language as the query divided by the total number of terms in the corpus), and/or the document frequency (i.e., the number of documents in a corpus of documents that contain the query term divided by the total number of documents in the corpus).

One or more characteristics of candidate navigational results in the superset determined at block 206 may serve as signals. For example, the system may consider a measure of the quality of the document (from index 125) or information (from index 127), a measure of the popularity of the document or information, the URL of the document, the geographic location where the document is hosted, when the search system 102 first added the document to the index 125, the language of the document, the length of the title of the document, and/or the length of the text of source anchors for links pointing to the document.

In some implementations, the system may consider scores associated with each candidate navigational search result of the superset. The system may calculate scores associated with candidate navigational search results in various ways based on various data. For example, the system may consider dates associated with each candidate, with more recent candidates scoring higher than older candidates. As another example, scores may be calculated by ranking engine 126, e.g., in a similar manner as ranking engine 126 calculates scores for standard search results. As used herein, "standard search results" may refer to search results that would be returned from a partially-formed search query independently of other signals. As yet another example, the system may also consider a user's previous interaction with the candidate navigational results. A document that the user has opened frequently and/or edited recently may receive a higher score than another document that the user has not opened for some time. As yet another example, the system may calculate scores for candidates based on one or more relationships between the candidates and the partial query, one or more alternative query suggestions, and/or one or more other candidate navigational search results. For example, a candidate that has a high level of similarity with (e.g., includes similar terms) the partial query and/or one or more alternative query suggestions may receive a higher score than another candidate that is less similar to the partial query and/or one or more alternative query suggestions.

In some implementations, the system may select, for the subset, candidates with scores that satisfy some threshold, or the x candidates with the highest scores—where x is a positive integer that typically would be no greater than two or three. In some implementations, the system only selects candidates having scores that are sufficiently different than scores of other candidates for the subset. For instance, if one or two candidates have scores that are similar to each other but much higher than other candidates, the system may select those two candidates for the subset. If all candidate navigational search results of the superset have similar scores, then the system may select the subset of navigational search results based on other signals. Or, if there's not enough information to make an informed determination about what the user is looking for or the user is simply performing a general search, the system may select zero candidates for the subset.

In some implementations, a ranking of the candidate navigational results may be determined and utilized to select the subset. For instance, candidates of the superset may be ranked using techniques similar to those used to rank standard search results. In some implementations, the top x ranked candidates may be selected for the subset. In other implementations, all candidates of the superset may be included in the subset in association with their rankings, so that they may later be presented to a user in a ranked order.

In some implementations, the system may consider document types associated with the candidate navigational search results for selection of the subset. Documents may have various types, such as word processing documents, spreadsheets, presentations, markup language files (e.g., XML, HTML), image files, multimedia files, emails, calendar entries, e-books, binary files, and so forth. Document types may be generic (e.g., spreadsheet) or proprietary (e.g., spreadsheet in Company A's proprietary format, spreadsheet in Company B's proprietary format, etc.). The system may determine a type associated with a particular document in various ways, such as through metadata, a filename extension, the filename itself, characteristics of the file, and so forth.

In some implementations, the system may consider a similarity between the partially-formed search query and the candidate navigational search results for selection of the subset. For example, the system may consider a fraction of terms of the partially-formed search query (e.g., before or after stemming and/or auto correction) that that also appear in a given navigational search result—e.g., in the result's title, body, metadata, etc.—in determining whether the given navigational search result is selected for inclusion in the subset. A navigational search result that shares a high number of terms with the partial search query may be more likely to be selected than one that shares less terms with the partial search query.

In some implementations, the system may select a predetermined number of candidate navigational search results of the superset that best satisfy a particular criterion for the subset. For example, the criterion may be "most recent." In such an implementation, the system may select the x most recent candidate navigational search results for the subset. As another example, the criterion may be "most popular," either to a particular user or to a population of users with which the user is associated. In such an implementation, the system may select the x most popular candidate navigational search results for the subset.

One or more characteristics of alternative query suggestions determined at block 204 may also serve as signals the system uses to select a subset of navigational search results from the superset. For example, if a particular term is common to several alternative query suggestions, candidate navigational search results that include or are associable with that term may be more likely to be selected from the superset. Other characteristics of alternative query suggestions that may be used by navigational search result engine 130 to select a subset of navigational search results from a superset of candidate navigational search results include but are not limited to length, common terms, scores of the alternative query suggestions, and so forth. In addition to these examples, signals similar to those associated with partially-formed queries (e.g., length, location, etc.) may also be used in the context of alternative query suggestions.

In some implementations, the system may consider scores associated with each alternative query suggestion. The system may calculate scores associated with alternative query suggestions in various ways based on various data. For example, previous user selection of a particular alternative query suggestion (or similar alternative query suggestions) may suggest that the alternative query suggestion is more useful/valuable to the user than others that the user has not selected before, and thus would receive a higher score than the others. As another example, if a particular alternative query suggestion is more relevant to an upcoming event (e.g., a holiday, an event on the user's calendar, etc.), than others, that particular alternative query suggestion may receive a higher score than the others.

In some implementations, the system may consider one or more identifiers contained in alternative query suggestions in selecting the subset of navigational search results. An "identifier" as used herein when referring to something that may be contained in an alternative query suggestion—or in a partial query as mentioned above—may refer to sequences of computer-readable characters that refer to a specific thing, such as a particular document, a particular URL, a telephone number, an email address, a person's or company's name, a particular location, and so forth. Thus, for example, if one alternative query suggested determined at block 204 of FIG. 2 includes a URL of a particular company (e.g., www.acme.com), candidate navigational results of the superset that are also associated with that URL (e.g., www.acme.com, www.acme.com/careers, www.acme.com/locations, etc.) may be more likely to be selected for the subset than candidates not associated with the URL.

In various implementations, the system may evaluate signals to select candidate navigational search results for the subset based on rules that are manually programmed or dynamic, e.g., based on empirical data. For example, machine learning techniques may be used with click records and/or query records to determine that users overwhelmingly only select a top navigational result after typing a particular number of characters, and almost never select any other navigational results. In such a scenario, the system may generate a rule by which it evaluates a signal corresponding to a partially-formed search query length. The rule may dictate, for instance, that the system select only a single candidate navigational search result for the subset after the particular number of characters is typed. As another example, click records and/or query records associated with a particular user may reveal that the user usually selects email navigational search results from senders of a particular domain, and not others. In such case, the system may generate a rule by which it evaluates a signal corresponding to an identifier contained in a partially-formed search query. The rule may provide, for instance, that the system only selects candidate navigational search results corresponding to emails from senders in that domain for the subset.

Referring back to FIG. 2, once the system has selected the subset of navigational search results from the superset of candidate navigational search results, the system may take various actions to cause the subset of navigational search results to be presented to a user. In some implementations, the system may cause the subset of navigational search results to be presented to the user alone, or in a manner such that they are visually emphasized over or presented before non-selected candidates of the superset.

In some implementations, at block 210, the system may provide, e.g., to client device 106, the subset of navigational search results for presentation independently of other search results that are responsive to a partially-formed query. For instance, the system may provide the subset of navigational search results to client device 106 as a list. Browser 107 and/or email client 109 may take this list as input and cause a drop down menu to be rendered below a search input field. The user may then be able to cease typing and select one of the navigational search results.

Additionally or alternatively, at block 212, the system may generate a search result presentation interface. The search result presentation interface may be configured to present the subset of navigational search results before or otherwise emphasized visually over other navigational search results and/or standard search results. In some implementations, the search result presentation interface may take the form of a web page document containing various markup languages (e.g., HTML, XML, etc.) and/or other instructions (e.g., JavaScript). In other implementations, the search result presentation interface may take other forms, such as a proprietary interface for a particular application. At block 214, the search result presentation interface may be provided to client device 106, e.g., by presentation engine 124.

As mentioned previously, the various operations of method 200 may be performed by various components of search system 102, or by a combination of components of search system 102 and client device 106. For example, to reduce visible flicker in browser 107, one or more operations of method 200 may be performed by client device 106. In some implementations, search system 102 may provide client device 106 with the superset of candidate navigational search results determined at block 206 and the alternative query suggestions determined at block 204. Client device 106 may include its own version navigational search result engine (not depicted in FIG. 1) that may perform all or selected aspects of operations associated with block 208 to select the subset. In some implementations, search system 102, e.g., by way of presentation engine 124 or navigational search result engine 130, may incorporate client-executable instructions (e.g., JavaScript) into data provided to client device 106. Client device 106 may execute those instructions to perform selected aspects of method 200 not performed by search system 102. In some implementations, to reduce visible flicker on client device 106, render throttling for alternative query suggestions and/or navigational search results may be disabled on client device 106.

Figure 3A:
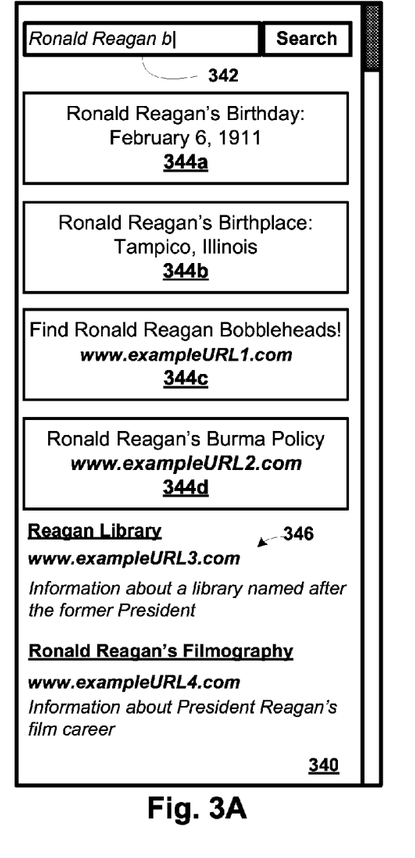
FIGS. 3A and B depict an example user interface utilized in describing an example method of modifying navigational search results based on one or more signals.
Figure 3B:
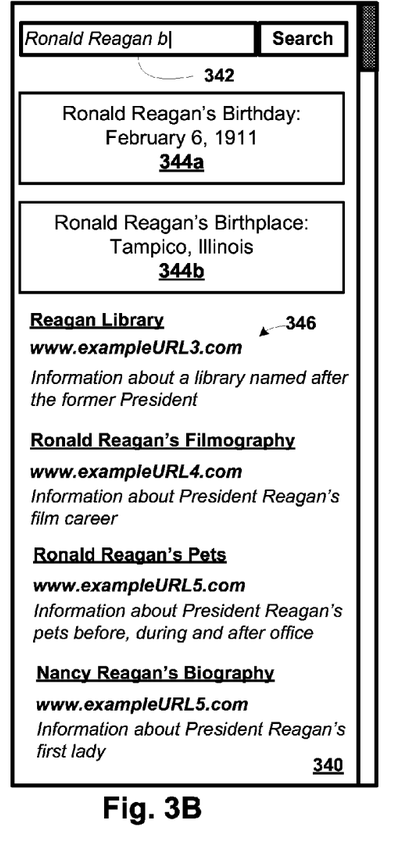

With reference to FIGS. 3A-B, an example graphical user interface is illustrated and utilized in describing example methods of selecting a subset of a superset of navigational search results based on one or more signals for presentation to a user. The example graphical user interface of FIGS. 3A-B may be displayed to a user via one or more applications executing on client device 106 such as browser 107 or email client 109. FIGS. 3A and B each depict a search result presentation interface 340 that may be presented to a user after typing the following characters of a partially-formed search query 342, "Ronald Regan b."

In FIG. 3A, four navigational search results 344a-d are depicted, and represent a superset of navigational search results determined, e.g., at block 206 of FIG. 2. A first navigational search result 344a includes information, e.g., obtained by information engine 122 from index 127, about Ronald Reagan's birthday. A second navigational search result 344b includes information, e.g., obtained by information engine 122 from index 127, about Ronald Reagan's birthplace. A third navigational search result 344c includes a link to a commercial website, e.g., obtained by indexing engine 120 from index 125, where novelty items associated with Ronald Reagan may be purchased. A fourth navigational search result 344d includes a link to a website about Reagan's policy towards the nation of Burma, e.g., obtained by indexing engine 120 from index 125. Below navigational search results 344a-d are standard search results 346.

In FIG. 3B, a subset of navigational search results, 344a and 344b, have been selected from the superset depicted in FIG. 3A (i.e. 344a-d) based on one or more signals. For instance, the superset of four candidate navigational search results shown in FIG. 3A has been narrowed to a subset of two navigational search results—e.g., information about Ronald Reagan's birthday and birthplace. This narrowing may be based on, for instance, previous search queries reflecting a user's interest in factual history, rather than novelty items or politics. In FIG. 3B, more standard search results 346 are visible because more space has been created by the removal of candidate navigational search results 344c and 344d. However, in some implementations, the same or less standard results may be shown.

In some implementations, a user may be presented with both graphical user interfaces from FIGS. 3A and B, in succession. For instance, the graphical user interface of FIG. 3A may be presented first. Then, after some pause (and assuming the user types no additional characters), the graphical user interface may transition to that shown in FIG. 3B. In other implementations, the user may only be presented with the graphical user interface depicted in FIG. 3B. In some implementations, the extra candidate navigational search results 344c and 344d may be removed prior to delivery of search result presentation interface 340 to client device 106. In other implementations, the extra candidates may be removed from search result presentation interface 340 by client device 106 prior to rendering. In yet other implementations, the interface of FIG. 3B may be presented first, and then after a pause, may be expanded to that of FIG. 3A (e.g., to safeguard against inaccurate surfacing of navigational results.

Figure 4A:
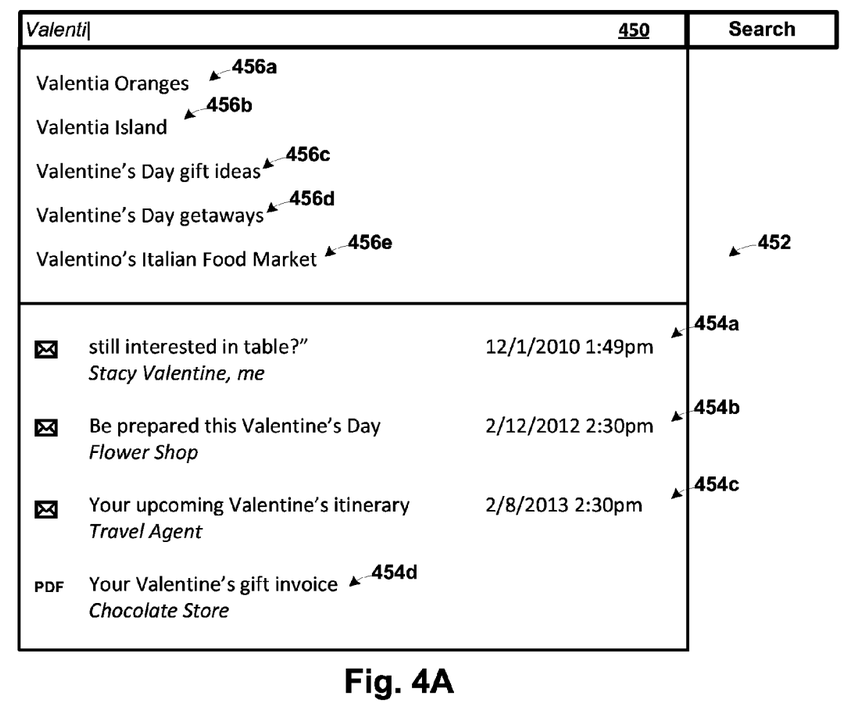
FIGS. 4A and B depict another example user interface utilized in describing an example method of modifying navigational search results based on one or more signals.
Figure 4B:
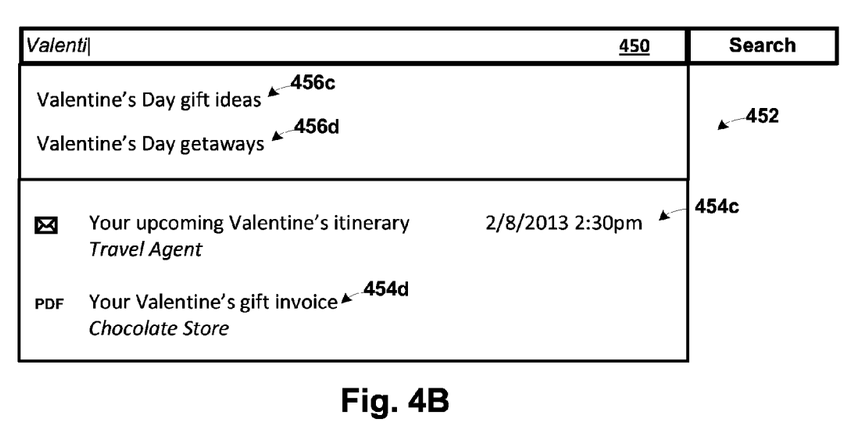

With reference to FIGS. 4A-B, another example graphical user interface is illustrated and utilized in describing example methods of selecting a subset of a superset of navigational search results based on one or more signals for presentation to a user. The example graphical user interface of FIGS. 4A-B may be displayed to a user via one or more applications executing on client device 106 such as browser 107 or email client 109. FIGS. 4A and B each depict a search query input field 450 and a drop down menu 452 that may appear below search query input field 450 upon a user entering a partial query, "Valenti."

In FIG. 4A, four navigational search results 454a-d are depicted, and represent a superset of navigational search results determined, e.g., at block 206 of FIG. 2. A first navigational search result 454a is an email from a sender named "Stacy Valentine." A second navigational search result 454b is an email from a Flower Shop with the subject line, "Be prepared this Valentine's Day." A third navigational search result 454c is an email from a travel agent with the subject, "Your upcoming Valentine's itinerary." A fourth navigational search result 454d is a PDF of an invoice for a recently-purchased Valentine's Day gift. Also depicted in FIG. 4A are alternative query suggestions 456a-e, which may have been determined by alternative query suggestion engine 128 of FIG. 1 at block 204 of FIG. 2.

In FIG. 4B, a subset of navigational search results, 454c and 454d, have been selected from the superset depicted in FIG. 4A (i.e. 454a-d) based on one or more signals. In particular, the superset of four candidate navigational search results shown in FIG. 4A has been narrowed to a subset of two navigational search results, both relevant to Valentine's Day, 2013. This narrowing may be based on one or more signals, such as an age of the candidates of the superset. Second navigational search result 454b is relevant to Valentine's Day, but is dated 2012, which means it is likely stale and should not be selected for the subset. First navigational search result 454a may also have been eliminated from consideration for the subset based on its age (2010). However, it also is not similar to any of the other candidates 454 or the alternative query suggestions 456a-e, nor would it likely be presented as a search result if any of those alternative query suggestions were selected by a user.

As was the case with FIG. 3B, in some implementations, a user may be presented with both graphical user interfaces from FIGS. 4A and B, in succession. For instance, the graphical user interface of FIG. 4A may be presented first. Then, after some pause (and assuming the user types no additional characters), the graphical user interface may transition to that shown in FIG. 4B. In other implementations, the user may only be presented with the graphical user interface depicted in FIG. 4B. In some implementations, the extra candidate navigational search results 454a and 454b may be removed prior to rendition of the drop down menu 450. In yet other implementations, the interface of FIG. 4B may be presented first, and then after a pause, may be expanded to that of FIG. 4A (e.g., to safeguard against inaccurate surfacing of navigational results.

FIGS. 4A and B depict another aspect of the present disclosure, namely, narrowing alternative query suggestions based on one or more signals. In some implementations, a superset of alternative query suggestions generated by alternative query suggestion engine 128 may be determined, e.g., at block 204 of FIG. 2. Alternative query suggestions 456a-e depicted in FIG. 4A are an example of such a superset. Using techniques and signals similar to those used to select the subset of navigational search results at block 208 of FIG. 2, one or more components of search system 102 or client device 106 may select, from the superset of alternative query suggestions, a subset of alternative query suggestions. Thus, in FIG. 4B, only alternative query suggestions 456c and 456d are selected for the subset, e.g., because they relate to Valentine's Day. Signals that may be used to select a subset of alternative query suggestions from a superset may be similar to those used to select a subset of navigational results from a superset of candidate navigational results, and may include but are not limited to one or more characteristics of a partially-formed search query (e.g., length, history of use, etc.), one or more characteristics of other alternative query suggestions (e.g., score, contained identifier, etc.), one or more characteristics of candidate navigational search results of a superset, one or more characteristics of a subset of navigational search results selected from a superset, and so forth. In some implementations, the subset of alternative query suggestions may be selected from the superset based on how many navigational search results are selected for the subset.

Figure 5:
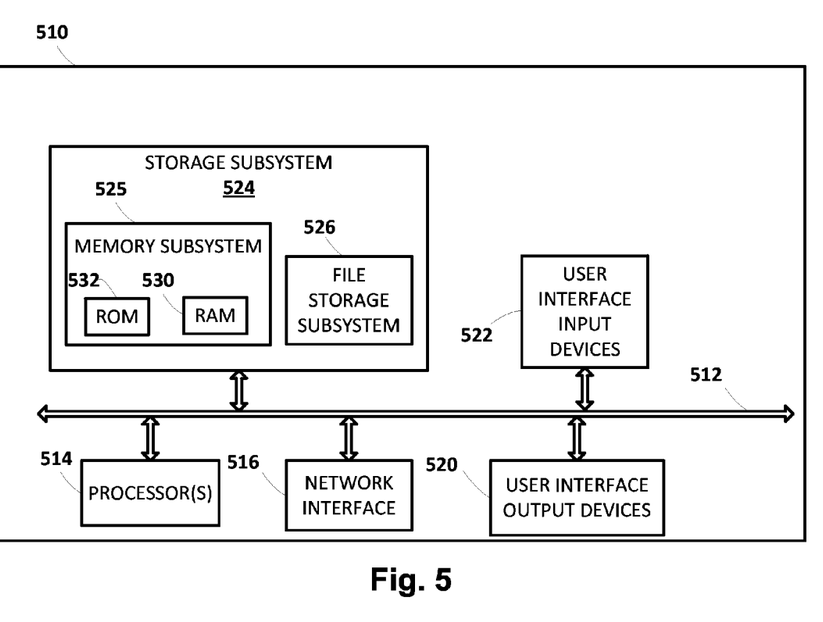
FIG. 5 illustrates an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 200.

These software modules are generally executed by processor 514 alone or in combination with other processors. Memory 525 used in the storage subsystem can include a number of memories including a main random access memory (RAM) 530 for storage of instructions and data during program execution and a read only memory (ROM) 532 in which fixed instructions are stored. A file storage subsystem 524 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 524 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
receiving, from a computing device operated by a user, a partial search query of the user;
identifying a superset of candidate navigational search results based on the partial search query;
selecting a subset of navigational search results from the superset based at least in part on one or more signals;
generating data to render a search result presentation interface that transitions, after a pause without user activity, between presenting the user with a first graphical user interface that includes the subset of navigational search results independently of other search results that are responsive to the partial search query and a second graphical user interface that includes the superset of candidate navigational search results; and
delivering the data to the computing device operated by the user.

2. The computer-implemented method of claim 1, further comprising identifying one or more alternate query suggestions based on the partial search query, wherein the one or more signals includes one or more characteristics of the one or more alternate query suggestions.

3. The computer-implemented method of claim 2, wherein the one or more characteristics of the alternate query suggestions include one or more scores associated with one or more alternate query suggestions.

4. The computer-implemented method of claim 2, wherein the one or more characteristics of the alternate query suggestions include one or more identifiers contained in one or more alternate query suggestions.

5. The computer-implemented method of claim 2, further comprising:
selecting, from the identified one or more alternate query suggestions, a subset of alternate query suggestions based at least in part on the one or more signals; and
providing the subset of selected alternate query suggestions.

6. The computer-implemented method of claim 1, wherein the one or more signals includes one or more characteristics of the partial search query.

7. The computer-implemented method of claim 6, wherein the one or more characteristics of the partial search query include an identifier contained in the partial search query.

8. The computer-implemented method of claim 6, wherein the one or more characteristics of the partial search query include a length of the partial search query.

9. The computer-implemented method of claim 6, wherein the one or more characteristics of the partial search query include an indication that the partial search query has been previously received from the user prior to the receiving the partial search query.

10. The computer-implemented method of claim 1, wherein the one or more signals include one or more characteristics of the candidate navigational search results.

11. The computer-implemented method of claim 10, wherein the one or more characteristics of the candidate navigational search results includes scores associated with the candidate navigational search results.

12. The computer-implemented method of claim 10, wherein the one or more characteristics of the candidate navigational search results includes a ranking of the candidate navigational search results.

13. The computer-implemented method of claim 10, wherein the one or more characteristics of the candidate navigational search results includes scores associated with the candidate navigational search results that satisfy a predetermined threshold.

14. The computer-implemented method of claim 10, wherein the one or more characteristics of the candidate navigational search results includes document types of the candidate navigational search results.

15. The computer-implemented method of claim 1, wherein selecting the subset of navigational search results includes selecting a predetermined number of the candidate navigational search results that best satisfy a criterion.

16. A system including memory, one or more processors operable to execute instructions stored in the memory, and an output device operably coupled with the one or more processors, wherein the memory stores instructions to:
provide at least a partial search query to a search system;
receive, from the search system, data usable to render a search result presentation interface; and
render the search result presentation interface via the output component based on the data;
wherein the search result presentation interface transitions, after a pause without user activity, between presenting a first graphical user interface that presents a superset of candidate navigational search results that are responsive to the partial search query and a second graphical user interface that presents a subset of navigational search results independently of other search results that are responsive to the partial search query, wherein the subset of navigational search results are selected from the superset based at least in part on one or more signals.

17. The system of claim 16, wherein the one or more signals includes one or more characteristics of one or more alternate query suggestions identified by the search system based on the partial search query.

* * * * *